United States Patent [19]

Sugahara et al.

[11] 3,911,952
[45] Oct. 14, 1974

[54] MECHANISM FOR CONTROLLED AIR DELIVERY TO AN AIR OPERATED ROTARY BODY

[75] Inventors: Eisuke Sugahara; Yusaku Yagi, both of Tokyo; Akihito Owada, Warabi, all of Japan

[73] Assignee: Nippon Piston Ring Co., Ltd., Japan

[22] Filed: June 3, 1974

[21] Appl. No.: 476,027

[30] Foreign Application Priority Data
June 1, 1973 Japan.............................. 48-62393

[52] U.S. Cl.................................. 137/580; 192/86
[51] Int. Cl.²..................... E03B 1/00; F16D 25/00
[58] Field of Search........... 192/85 R, 85 A, 85 AA, 192/85 AT, 88 A, 88 B, 86; 137/580

[56] References Cited
UNITED STATES PATENTS

| | | | |
|---|---|---|---|
| 2,242,184 | 5/1941 | Reuter | 137/580 |
| 3,598,147 | 8/1971 | Kosaka | 137/580 |

*Primary Examiner*—Benjamin W. Wyche
*Attorney, Agent, or Firm*—Sughrue, Rothwell, Mion, Zinn, & Macpeak

[57] ABSTRACT

A fluid-operated apparatus includes a rotary member integral with the fluid-operated rotary body in a stationary member adjacent thereto in end face confronting position with respect to the rotary member. A pair of circumferential grooves within the end face of the stationary member carry respectively, an annular sealing piston for controlling check valve actuation within the rotary member and an annular sealing piston for controlling ventilation of the fluid-operated rotary body by opening the check valve. Fluid passage project through the annular piston and communicate to the end face of the rotary member. The rotary member is provided with check valves within passages corresponding to the passages within the actuator annular piston for controlled supply of compressed fluid to the fluid-operated rotary body. The bores within the rotary member which carry the check valves and form a portion of the fluid passage leading from the stationary member to the fluid-operated rotary body and carry ventilation control pistons operatively disposed with respect to the check valves which ventilate pistons are fluid connected by passages within the rotary member leading to the annular pistons within the stationary member permitting selective ventilation of the fluid-operated rotary body by applying fluid pressure to the ventilation pistons.

6 Claims, 7 Drawing Figures

MECHANISM FOR CONTROLLED AIR DELIVERY TO AN AIR OPERATED ROTARY BODY

BACKGROUND OF THE INVENTION

1. FIELD OF THE INVENTION

This invention relates to mechanisms for the controlled feeding of pressurized air to an air-actuated rotary body.

2. DESCRIPTION OF THE PRIOR ART

This invention relates to the subject matter of U.S. Pat. No. 3,598,147 and U.S. pat. application Ser. No. 429,440, filed Dec. 28, 1973, assigned to the common assignee. These references disclose mechanisms for feeding compressed air to an air-actuated rotary member, particularly to a clutch arranged between a marine engine and the screw propeller of a ship without the necessity of providing the power shaft with an end face and with reduced pressure loss. The first of these mechanisms is, however, rather bulky in terms of unit size and requires considerable space for mounting of the control mechanisms to the air-actuated rotary body.

Recent requirements have imposed severe restrictions on the allowable space for such rotary members as air-operated clutches and like pneumatic apparatus, and consequently, for the axial length of such rotary bodies, the air feeding device and control mechanism and their support is extremely limited.

In view of the foregoing requirements, the present invention provides a mechanism which is, like that of the second reference, an improvement on U.S. Pat. No. 3,598,147 and permits the controlled feeding of air to an air-actuated rotary body by a mechanism of reduced axial length.

In general, the mechanism of the present invention for controlling the feeding of air to an air-actuated rotary mechanism constitutes a fluid-operated apparatus which in combination includes a rotary fluid-operated body, a rotary member and a stationary member, said rotary member and said stationary member have confronting axial end faces, with the stationary member being provided with first and second circumferential grooves on the end face thereof facing said opposed end face of the rotary member. First and second annular pistons are positioned within respective grooves. Means are provided for supplying pressurized fluid to respective grooves for forcing said pistons towards said rotary member end face and passages are provided through the pistons to communicate the fluid supply to the rotary member. The rotary member includes first fluid passage means leading from the rotary member end face, in alignment with the stationary piston passage of one of said grooves to the rotary fluid-operated body and check valves are provided within the rotary member first fluid passages. An annular ventilation piston is carried by the rotary member and is operatively positioned with respect to the check valves so as to selectively open the normally closed check valves and to permit ventilation of the rotary fluid-operated body. Second fluid passage means within the rotary member open onto the end face of the rotary member in alignment with the fluid passages within the other annular piston of the stationary member to fluid couple the annular ventilation pistons to the source of pressurized fluid such that axial shifting of the annular ventilation pistons opens the check valves.

DESCRIPTION OF THE PREFERRED EMBODIMENT

Briefly stated, the present invention is directed to that portion of a fluid-operated apparatus which comprises the air feeding mechanism. The fluid-operated apparatus comprises in combination a rotary member A which preferably is integral with air actuation rotary body C which may preferably take the form of a clutch body, in FIG. 1, and a stationary member B which is connected by way of valves to a pressurized air supply or air feeding source. The stationary member B is disposed in adjacent, end face confronting position with respect to the rotary member A. The embodiment of FIG. 1 is essentially similar to that of the embodiment of FIG. 4.

Figure 2:
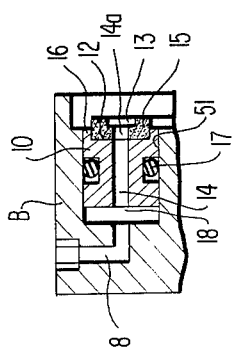
FIG. 2 is an enlarged, detailed cross-section of that portion of the apparatus shown in FIG. 1 including the annular piston for supplying compressed air to the check valves for controlled actuation of the check valves within the rotary member.
Figure 3:
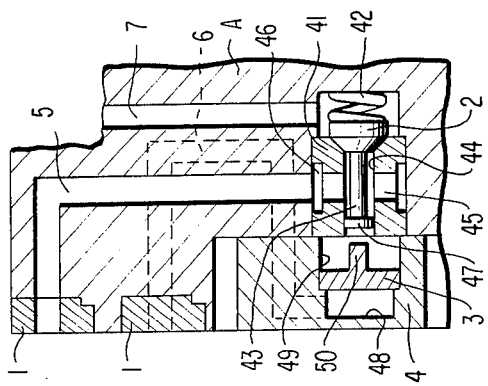
FIG. 3 is an enlarged, detailed cross-section of a portion of the rotary member of the apparatus of FIG. 1.
Figure 1:
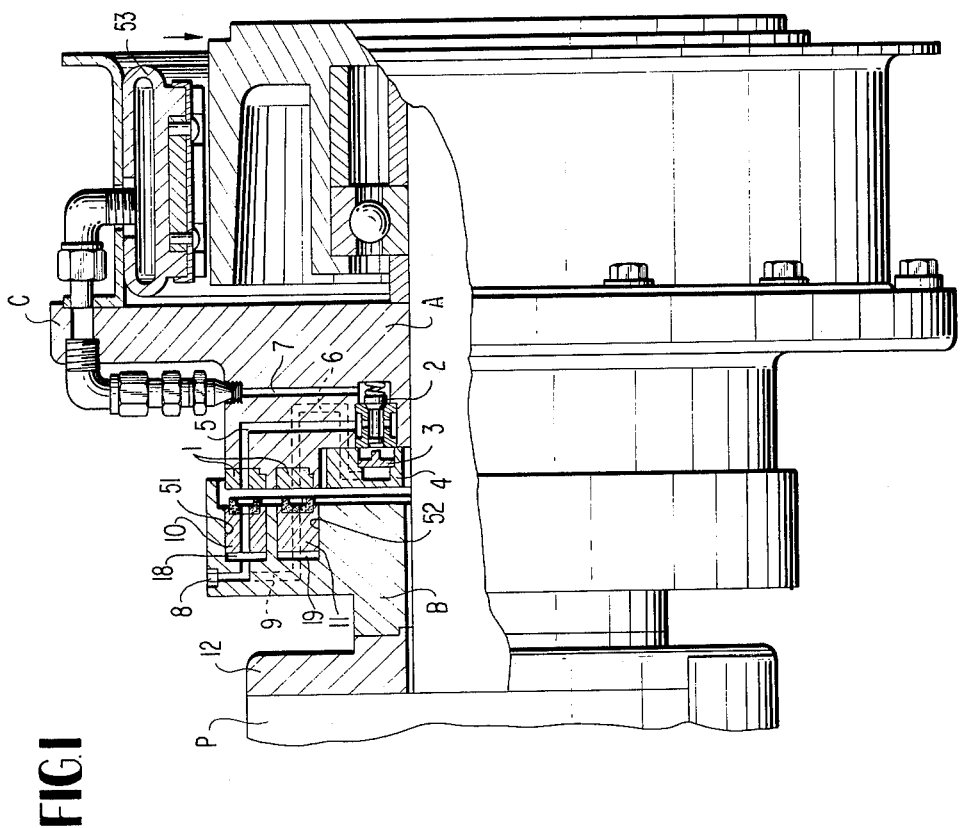
FIG. 1 is an elevational view partially in section of the air-feeding mechanism of the present invention.

A preferred embodiment of the invention as shown in FIGS. 1–3, has the end face of the rotary member A provided with sliding members or sealing rings 1 and 1' which extend circumferentially about the end face in concentric fashion and correspond to sealing members to be described further. The rotary member A is provided with a plurality of bores 40 at spaced circumferential positions within which are positioned cylindrical members 41 defining a fixed valve seat for an axially movable check valve 2 which is spring biased towards closed position by the coil spring 42. Each valve 2 is provided with a stem 43 which rides within axial bore 44 of cylinder 41. A transverse bore or drilled hole 45 intersects bore 43 and the cylinder 41 is provided with a circumferential recess 46 such that the transverse bore or hole 45 is in fluid communication with a fluid passage 5 within the rotary member A. The stem 43 terminates in a radial enlargement or enlarged diameter portion 47 which is sealably carried within axial bore 40. A cylinder 4 is fixed to the rotary member A and is provided with bore 48 which is counterbored at 49, with the counterbore receiving annular piston 3 having a projection 50 at its center, which selectively presses upon the valve stem enlarged diameter portion 47. In this respect, second fluid passages 6 are carried within rotary member A for each check valve, opening up at the center of sliding member or sealing ring 1' on the end face of the rotary member A and opening up within bore 48 behind the ventilating piston 3, such that application of fluid pressure to passage 6 within rotary member A causes the ventilation pistons 3 to move from left to right, FIG. 3, and to open valves 2 against the bias of coil springs 42. Opening of the valves 2 permit fluid connection between passages 5 and 7 of the rotary member A. In this respect, each of the check valves 2 is in fluid communication by way of pasage 7 with the air-actuated rotary body C which in this case is illustrated as being a rotary clutch body.

Figure 5:
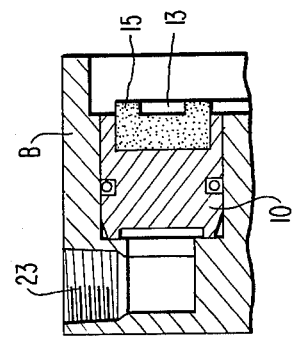
FIG. 5 is a schematic block diagram of the fluid supply system for the apparatus of FIGS. 1 and 4.

The stationary member B is arranged as shown in FIG. 1 such that it lies axially adjacent the rotary member A with confronting end faces. The stationary member B is provided with fluid inlets or passages 8 and 9, inlet passage 8 admitting compressed air for sealing and check valve actuation to pressurize the inflatable friction member 53, while inlet 9 admits compressed air for sealing and for ventilation of the inflatable friction member 53 by opening the check valves 2. The stationary member B is provided with concentric grooves 51 and 52 within the end face facing the rotary member A. A first annular piston 10 is provided within the groove 51, while an annular piston 11 is provided within groove 52. Inlets 8 and 9 are in fluid communication with grooves 51 and 52 respectively. The stationary member B is securely supported by cover 12 of pillow block P such that normally the annular pistons 10 and 11 are spaced from the rotary member A. Application of fluid pressure through passages or inlets 8 and 9 cause the annular pistons 51 and 52 to shift from left to right in FIG. 1 such that they contact respectively sealing rings 1 and 1' on the rotary member A. It is preferred that the contacting portions of the annular pistons 10 and 11 be formed of sintered carbon material impregnated with synthetic resins. A sintered carbon, for example, capable of enduring high temperature in excess of 200° C., and having a Shore hardness in excess of 80, is impregnated with silicon resin or tetrafluoroethylene resin. Each of the annular pistons 10 and 11 is provided internally with a circumferential groove 12 on the end face thereof facing the rotary member A, which circumferential groove 12 supports a sintered carbon material impregnated ring 15, ring 15 being provided with a circumferential groove 13 forming an air manifold or reservoir, with the ring 15 being provided with apertures at circumferentially spaced positions as at 14a which are of similar diameter and aligned with fluid passages 14 extending through each annular piston and in fluid communicating the reservoir to respective air chambers 18 and 19 for pistons 10 and 11. O-rings 17 are carried by each of the pistons for preventing leakage of the compressed air between the pistons 10 and 11 and the stationary body B. The annular sliding members or sealing rings 1 and 1' are carried by the rotary member A and are preferably formed of steel and the like and may be subjected to a hardening treatment such as by quenching on the sliding surface thereof and finished with polishing or lapping to effect low friction contact between these members and the relatively stationary sintered carbon rings 15 in contact therewith. Each of the inlets or passages 8 and 9 may be formed by radially drilling from the outer circumference of the stationary member B at different circumferential positions, and these passages or inlets may be connected by way of external conduits to a source of fluid, FIG. 5.

The fluid-operated apparatus as described above operates as follows: In the case where compressed air is to charged to the clutch body C and in particular to the inflatable member 53, FIG. 1, the compressed air for actuation of the clutch is supplied through inlet passage 8 entering the air chamber 18 at the rear of the annular piston 10 which forces the annular piston 10 to contact the sealing ring 1 under the applied force of the fluid pressure acting on the left hand end face of annular piston 10 so as to maintain the annular piston in firm sealing contact with sealing ring 1 as it rotates relative to the fixed body B. Sealing is maintained throughout rotation and compressed air is fed via the air reservoir 13 which acts as a circumferential channel leading to all of the passages 5, which terminate axially opposed to the air reservoir 13, within sealing ring 1. Thereby, compressed air is supplied through passages 5 communicating with the check valves 2 by way of transverse bores 45 within cylinder 41 and the passage formed between stem 43 and the axial bores 44 within cylinder 41 forcing each valve 2 from its valve seat and compressing its coil spring 42. Fluid passage 5 at each check valve location is fluid coupled to fluid passage 7 within the rotary member A, permitting the compressed air to expand member 53 and effect a clutching action as indicated by the arrow, FIG. 1. When a predetermined pressure is reached within member 53 of the clutch body C, the compressed air for sealing and actuation is terminated, that is, the supply is cut off, the annular piston moves away from the sealing ring 1, coil springs 42 closes check valves 2 and fluid pressure is maintained within member 53.

To effect release of the compressed air from the interior of clutch member 53, compressed air at a pressure relatively lower than that within passage 7 and the expandable member 53 is delivered to inlet passage 9 which directs air to chamber 19 of the fixed member B, whereby, the annular piston 11 is forced to move from left to right and against the sealing ring 1' and maintains sealed contact therewith. Compressed air passes into passage 6 of the rotary member A and acts against the ventilating pistons 3 in each instance, forcibly shifting the ventilating pistons 3 from left to right, whereby, projection 50 contacts the enlarged diameter terminal end 47 of a respective valve stem 43 forcing the check valve 2, in each case, to open against the bias of coil spring 42 and permitting the compressed air within expandable member 53 to escape to the atmosphere through passages 5, since sealing ring 1 is not in sealed contact with annular piston 10 at this time.

Figure 4:
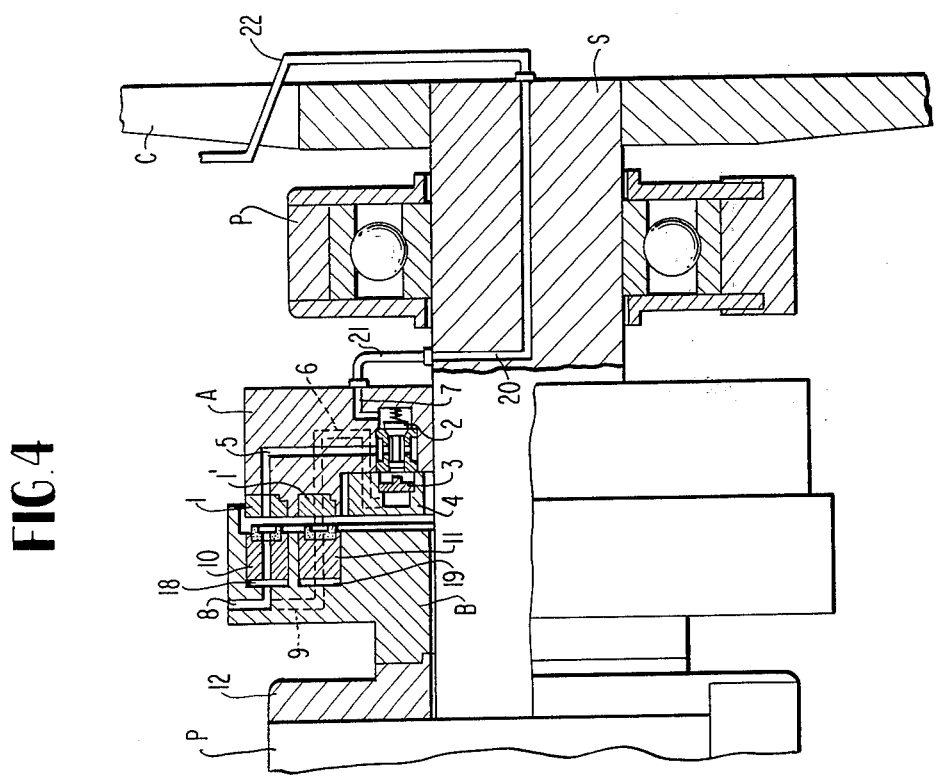
FIG. 4 is an elevational view, partially in section, of another embodiment of the fluid-operated apparatus of the present invention.

Reference to FIG. 4 shows another embodiment of the present invention, wherein a rotary member A' is integral with an air-actuated rotary body C by way of a rotating shaft S which commonly supports these members for rotation. The elements of this embodiment which are identical to those appearing in the first embodiment, are given like numerical designations. The rotating shaft S is supported by a pillow block P' and includes therein an air passage 20, one end of which communicates through pipe 21 to a fluid passage 7 within rotary member A'. The other end of air passage 20 within shaft S communicates through a pipe 22 to the air pressure actuated member (not shown) of clutch body C. The operation of this embodiment of the invention is substantially the same as that of the embodiment of FIG. 1, with the exception that the compressed air supplied to the rotary member from the stationary member and thence to the air actuated rotary body C, passes indirectly by way of the rotating shaft to the rotary body C. Further, while in both illustrated embodiments compressed air is employed as the pressurized fluid, it is possible to use other pressurized fluid in lieu of compressed air. In this respect, the compressed air supply system of the present invention for use with all embodiments is illustrated schematically in FIG. 5, wherein by way of the block diagram a fluid supply supplies pressurized air, through filter F, to inlet passages 8 or 9 as shown by the arrow, controlled respectively by solenoid valves $SOL_1$ and $SOL_2$. Since the fluid pressure within passage 9 is desired to be somewhat less than that in passage 8, the passages are equipped downstream of the fluid supply with pressure control devices 55 and 56 respectively, in this case, upstream of the solenoid valves $SOL_1$ and $SOL_2$.

Further, while in the illustrated embodiment of FIGS. 1–4 and with particular reference to FIG. 2, the annular pistons 10 and 11 permit automatic sealing of the connection between the stationary and the rotary members and for supplying pressurized air to actuate the clutch body air actuated member 53 and to cause ventilation or pressure relief of that body by selective operation of the check valves and its release mechanism by way of the ventilation piston in each case. However, the present invention is not necessarily restricted to these embodiments, and it is also possible as shown in FIGS. 6 and 7, to supply the compressed air separately through a conduit independent of the air chamber to either annular piston 10 and 11, rather than commonly supply compressed air both for piston actuation and sealing from the same air chamber such as chambers 18 and 19 in the illustrated embodiment of FIGS. 1–4 inclusive.

Figure 6:
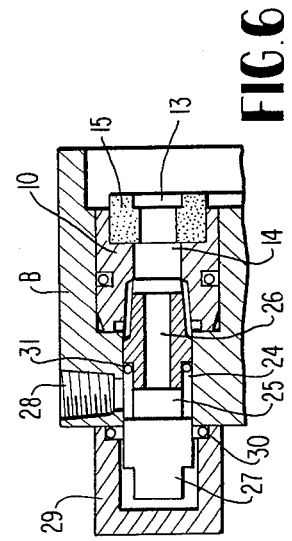
FIG. 6 is a detailed sectional view of a modified stationary member for the fluid-operated apparatus of the present invention and forming another embodiment thereof.
Figure 7:
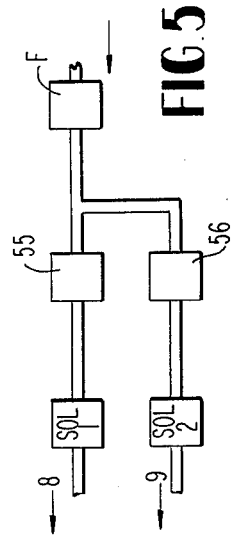
FIG. 7 is a detailed, cross-sectional view of a stationary member for the fluid-operated apparatus of the present invention, in slightly different form.

Turning to FIG. 6 and FIG. 7, at the rear of the annular piston 10 for supplying the compressed air for sealing and actuation purposes, a fluid passage 23 supplies the compressed air for sealing purposes only and an aperture 14 acts in combination with an actuating pressure supply spool 27, the spool 27 having an outer peripheral, groove 24 provided on its entire circumference, and a transverse spool passage 25 communicates with the circumferential peripheral groove 24, this passage intersecting the axial passage 26. The circumferential, peripheral groove 24 of spool 27 is in communication with passage 28 which supplies the compressor with air for clutch body actuation, the passage 28 extends radially from the outer circumference of stationary member B and is shifted circumferentially from passage 23. Passage 23 supplies the compressed air for sealing purposes which acts on the rear surface of annular piston 10 and is connected to an external conduit by way of a threaded PT pipe. The spool 27 is positioned within the cover 29 which cover is fixed by way of O-ring 30 to stationary member B. Spool 27 is also provided with an O-ring 31 which seals the fluid entering that radial passage 28 from that entering passage 23.

In place of spool 27 to provide the connection between the source of fluid pressure and passage 14 within piston 10, a passage (not shown) may be provided through the stationary member for insertion of a conduit therethrough which opens at the end face thereof and a conduit to be fluid coupled with passage 14 may be inserted therein. For supplying separately the compressed air for actuation through the conduit independent of the air chamber, four solenoid valves are required for sealing and for supplying the compressed air for actuating purposes. The pressure of the compressed air for sealing is preferably set, for example, at 4 Kg/cm² which is lower than the actuating air pressure and the pressure of the compressed air for actuation being set at 8 Kg/cm², for example. It is also possible to provide a force applying means for indirectly pressing the annular sealing pistons 10 and 11 into sealing contact with slides 1 and 1' respectively.

For the passages 14, if more than one is provided for the annular piston such as piston 10 or 11, for supplying the compressed air for sealing and for clutch actuation, and for ventilation of the clutch actuator, it should be noted that such passages should be arranged at equispaced circumferential distances in order to maintain correct balance, and this consideration is also applicable to the arrangement of the check valve as well as the ventilation pistons in passages 5 and 6.

In the fluid operated apparatus of the present invention, the stationary member B is disposed adjacent to the rotary member A, and therefore, it is not necessary to provide casings on both sides of the rotary member as occurs in the apparatus of the referred to U.S. Pat. No. 3,598,147. Thus, the mechanism for the controlled feeding of air to the rotary member of the fluid-operated apparatus to which this invention applies, can be constructed so as to have about the same axial dimensions as that of the casing at one side of the prior art apparatus. Therefore, the mechanism of this invention can be rendered highly compact, thereby enabling one to install an actuated rotary body without restriction in terms of its axial length.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A fluid-operated apparatus comprising:
a rotary fluid-operated body,
a rotary member, and
a stationary member,
said rotary member and said stationary member having axial confronting end faces,
said stationary member being provided with first and second circumferential grooves on the end face thereof facing the opposed end face of said rotary member,
first and second annular pistons positioned within respective grooves,
means for supplying pressurized fluid to said grooves for forcing said pistons towards said rotary member end face,
passages within said pistons at spaced circumferential positions and in fluid communication with said fluid supply means,
said rotary member including first fluid passage means leading from said rotary member end face and in alignment with the passages within the pistons within one of said grooves of said stationary member,
said fluid passage means leading to said rotary fluid-operated body,
check valves within said rotary member first fluid passage means, annular ventilation pistons carried by said rotary member and operatively positioned respectively with respect to said check valves, and second fluid passage means within said rotary member opening onto said end face in alignment with the fluid passage of said other annular piston within said stationary member and being operatively coupled to said ventilation pistons, whereby; selective delivery of pressurized fluid by way of said first and second annular pistons within said stationary member causes fluid pressure to be applied to said rotary fluid-operated body or to be relieved therefrom.

2. The fluid-operated apparatus as claimed in claim 1, wherein said rotary member is integral with said fluid-operated rotary body.

3. The fluid-operated apparatus as claimed in claim 2, wherein said rotary fluid-operated body and said rotary member are fixed to a common shaft and said shaft includes fluid passage means therein for indirectly communicating said fluid operated body to said rotary member.

4. The fluid-operated apparatus as claimed in claim 1, wherein said first and second circumferential grooves within the end face of said stationary member and the rear face of said annular pistons define fluid chambers which receive said pressurized fluid from said supply means for direct forcing said pistons towards said rotating member, and said passages within said pistons extend therethrough and are in direct fluid communication with said chamber for supplying pressurized fluid directly to said fluid operated body by way of said check valves.

5. The fluid-operated apparatus as claimed in claim 1, wherein separate sources of pressurized fluid are supplied to the passages within said annular piston leading to said rotary member to said grooves and acting on said end faces of said pistons to force said pistons into sealing engagement with said rotary member.

6. The fluid-operated apparatus as claimed in claim 5, wherein each annular piston of said stationary member includes a circumferential groove within the end face facing said stationary member, and a sintered carbon ring is positioned within said circumferential groove with said sintered carbon ring being apertured at circumferentially spaced positions corresponding to the fluid passages extending within said annular piston and being fluid coupled to said fluid pressure supply means.

* * * * *